(12) United States Patent
Cheng et al.

(10) Patent No.: US 7,539,523 B2
(45) Date of Patent: May 26, 2009

(54) PORTABLE COMMUNICATION DEVICE WITH ROTATING DISPLAY

(75) Inventors: Chia-Min Cheng, Taipei (TW);
Yin-Lung Huang, Taipei (TW)

(73) Assignee: Inventec Corporation, Taipei (TW)

( * ) Notice: Subject to any disclaimer, the term of this patent is extended or adjusted under 35 U.S.C. 154(b) by 549 days.

(21) Appl. No.: 11/329,048

(22) Filed: Jan. 11, 2006

(65) Prior Publication Data
US 2007/0161396 A1    Jul. 12, 2007

(51) Int. Cl.
*H04B 1/38* (2006.01)
(52) U.S. Cl. .............. 455/575.1; 455/575.3; 455/575.4; 455/128; 455/347
(58) Field of Classification Search ................. 455/566, 455/575.3, 556.1, 575.1, 575.4, 550.1, 66.1, 455/90.3, 128, 347
See application file for complete search history.

(56) References Cited

U.S. PATENT DOCUMENTS 6,115,239 A * 9/2000 Kim ........................... 361/681

2005/0085272 A1 * 4/2005 Anderson et al. ........... 455/566
2005/0130720 A1 * 6/2005 Finke-Anlauff .......... 455/575.3
2006/0105804 A1 * 5/2006 Kumar ..................... 455/550.1

* cited by examiner

*Primary Examiner*—Tuan A Pham
(74) *Attorney, Agent, or Firm*—Bacon & Thomas, PLLC

(57) ABSTRACT

The present invention is to provide a portable communication device with a rotating display, which comprises a phone body and a cover hingedly connected to the phone body. Thus, the cover may pivot about the phone body either in one direction to close onto the phone body or in the other opposite direction to open from the phone body. The cover comprises an opening for receiving a display having a first pivotal element provided at either side of the display and a second pivotal element provided at either side of the opening. The first pivotal element is connected to the second pivotal element at the same side and is adapted to turn relative thereto to form a pivot such that rotating the display in the opening on the opposite pivots will appropriately dispose either the screen of the display facing the phone body or in a direction opposing the phone body.

9 Claims, 3 Drawing Sheets

PORTABLE COMMUNICATION DEVICE WITH ROTATING DISPLAY

FIELD OF THE INVENTION

The present invention relates to portable communication devices (e.g., mobile phones) and more particularly to a portable communication device with a rotating display.

BACKGROUND OF THE INVENTION

A conventional mobile phone comprises a phone body and a cover. The phone body and the cover are hingedly connected together. Thus, the cover may pivot about the phone body either in one direction (e.g., clockwise) to close the cover onto the phone body or in the other opposite direction (e.g., counterclockwise) to open the cover from the phone body. The cover comprises a front display (i.e., main display) facing the phone body. Alphabet, numbers, and images are shown on the front display when a user opens the cover from the phone body by pivoting. Thus, a user may make a call by dialing or send a short message by taking advantage of the alphabet, numbers, and images. Further, a back display (i.e., auxiliary display) is provided on the back of the cover opposite the phone body. The back display is adapted to display time, battery consumption, and/or incoming call(s). Thus, a mobile phone user may know time, battery consumption of the mobile phone, and/or whether there is any incoming call by viewing the back display after closing the cover onto the phone body.

There is another type of palm mobile phone commercially available from some manufacturers of the art. The mobile phone has features such as word processing and file management the same as that of a typical personal computer. The mobile phone comprises a phone body and a cover. The phone body and the cover are hingedly connected together. Thus, the cover may pivot about the phone body. The phone body comprises a standard keyboard on a top surface facing the cover. A user may quickly type letters and digits on the standard keyboard for input. The cover further comprises a telephone keypad on its back opposite the phone body. A user may press keys of the telephone keypad to make a call. After closing the cover onto the phone body by pivoting, a user may press keys of the telephone keypad to make a call (i.e., using the palm mobile phone as a typical mobile phone). To the contrary, after opening the cover from the phone body by pivoting, both the standard keyboard on the phone body and the front display on the cover facing the phone body are exposed. Thus, a user may type letters and digits on the standard keyboard for input which is then shown on the front display. As such, the user may perform features such as word processing and file management.

In view of above, both front display and back display are requisite components of the hinged cover of the well known mobile phone. By configuring the cover having front display and back display, a user may operate the mobile phone when either the cover is closed onto the phone body by pivoting or the cover is open from the phone body by pivoting. However, the prior art design suffered from several disadvantages including weight increase of the mobile phone, manufacturing cost increase, and large power consumption. Thus, it is desirable to provide a novel portable communication device having a rotating display in order to overcome the inadequacies of the prior art.

SUMMARY OF THE INVENTION

After considerable research and experimentation, a portable communication device with a rotating display according to the present invention has been devised so as to overcome the above drawbacks of the prior art.

It is an object of the present invention to provide a portable communication device with a rotating display. The communication device comprises a phone body and a cover. The phone body is hingedly connected to the cover. Thus, the cover may pivot about the phone body either in one direction to close onto the phone body or in the other opposite direction to open from the phone body. The cover comprises an opening for receiving a display. A first pivotal is provided at its either side of the display. A second pivotal element is provided at either side of the opening. The first pivotal element is connected to the second pivotal element at the same side and is adapted to turn relative thereto to form a pivot such that rotating the display in the opening on the opposite pivots will appropriately dispose either the screen of the display facing the phone body or in a direction opposing the phone body. Thus, a user may use alphabet, numbers, and images shown on the screen to make a call, send a short message, or have access to the Internet. Also, a single rotating display having the benefits of two screens is provided in the communication device. By utilizing this portable communication device with a rotating display, advantages including cost reduction, power saving, and lightweight are obtained.

The above and other objects, features and advantages of the present invention will become apparent from the following detailed description taken with the accompanying drawings.

DETAILED DESCRIPTION OF THE PREFERRED EMBODIMENTS

Figure 1:
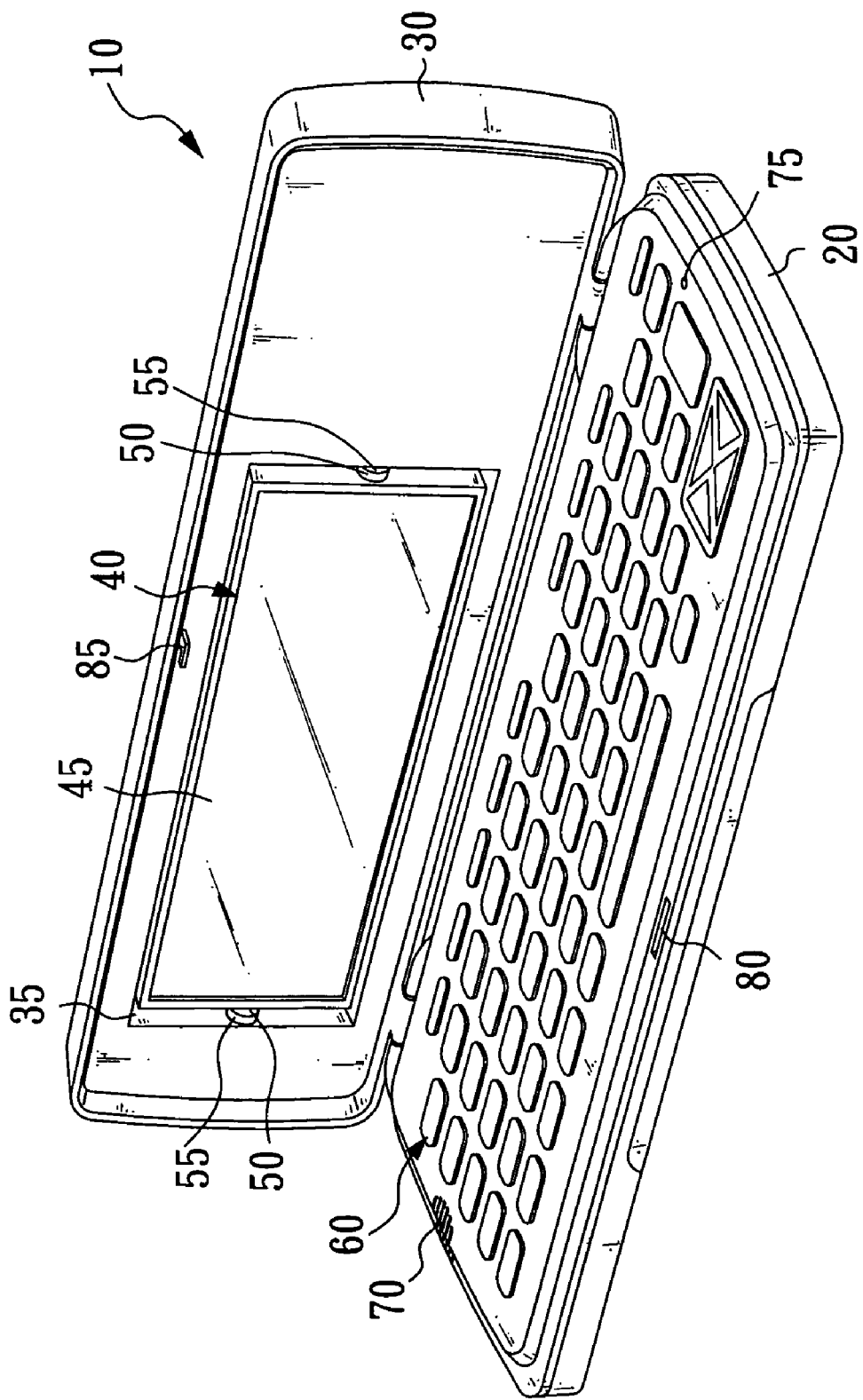
FIG. 1 is a perspective view of a preferred embodiment of portable communication device according to the invention in an open state.
Figure 2:
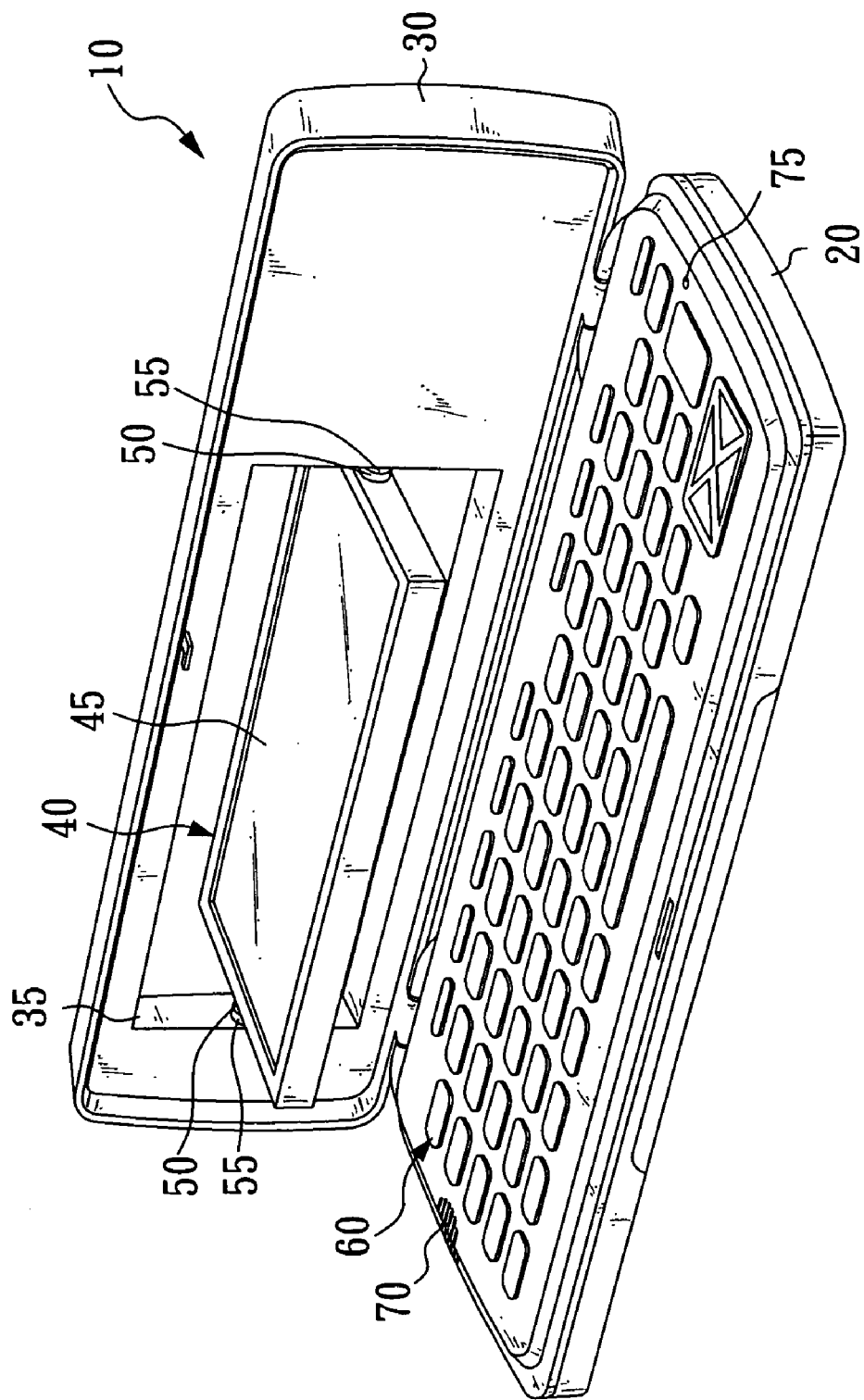
FIG. 2 is a view similar to FIG. 1 where the display is rotated to a substantially horizontal position.

Referring to FIGS. 1 and 2, a portable communication device 10 in accordance with a preferred embodiment of the invention is shown. The communication device 10 comprises a phone body 20, a cover 30, and a display 40. The phone body 20 has one end hingedly connected to one end of the cover 30. Thus, the cover 30 may pivot about the phone body 20 either in one direction (e.g., clockwise) to close onto the phone body 20 (see FIG. 3) or in the other opposite direction (e.g., counterclockwise) to open from the phone body 20 (see FIGS. 1 and 2). The cover 30 comprises a rectangular opening 35 having a confined space for receiving the display 40. The display 40 comprises a first pivotal element 50 provided at a center of its either side. A second pivotal element 55 is provided at a center of either side of the opening 35 facing the first pivotal element 50. The first pivotal element 50 and the second pivotal element 55 at the same side are rotatably connected together (i.e., the first pivotal element 50 adapted to turn relative to the second pivotal element 55) and form a pivot. Thus, the display 40 in the opening 35 may freely rotate on two opposite pivots.

Referring to FIGS. 1 and 2 again, in an open state of the communication device 10 (i.e., the cover 30 is pivoted away from the phone body 20), a user may turn the display 40 in the opening 35 to dispose a screen 45 of the display 40 facing the phone body 20. Alternatively, the user may turn over the display 40 in the opening 35 to dispose the screen 45 in a direction opposing the phone body 20 prior to closing the cover 30 onto the phone body 20 (see FIG. 3). By configuring the display 40 as a rotatable one, a user may turn the screen 45 to a suitable position when the communication device 10 is either open or closed. Thus, a user may use alphabet, numbers, and images shown on the screen 45 to make a call, send a short message, or have access to the Internet. Also, a single rotating display 40 having the benefits of two screens is provided in the communication device 10. Thus, advantages of cost reduction, power saving, and lightweight are obtained.

Referring to FIGS. 1 and 2 again, a first input section 60 is provided on a top surface of the phone body 20 facing the cover 30. Referring to FIG. 3 again, a second input section 65 is provided on a top surface of the cover 30 opposing the phone body 20. The first input section 60 is implemented as a standard keyboard (e.g., QWERTY keyboard) such that a user may quickly type letters and digits. The second input section 65 is implemented as a telephone keypad such that a user may quickly dial a telephone number. A user may press keys of the second input section 65 to either input digits to make a call or input letters to send a short message with the input being shown on the screen 45 of the display 40 when the communication device 10 is closed and the screen 45 of the display 40 is turned over to dispose in a direction opposing the phone body 20. To the contrary, a user may press keys of the first input section 60 to quickly type letters and digits for word processing or file management with the input being shown on the screen 45 of the display 40 when the communication device 10 is open with the first input section 60 being exposed and the screen 45 of the display 40 is turned over to dispose facing the phone body 20.

Figure 3:
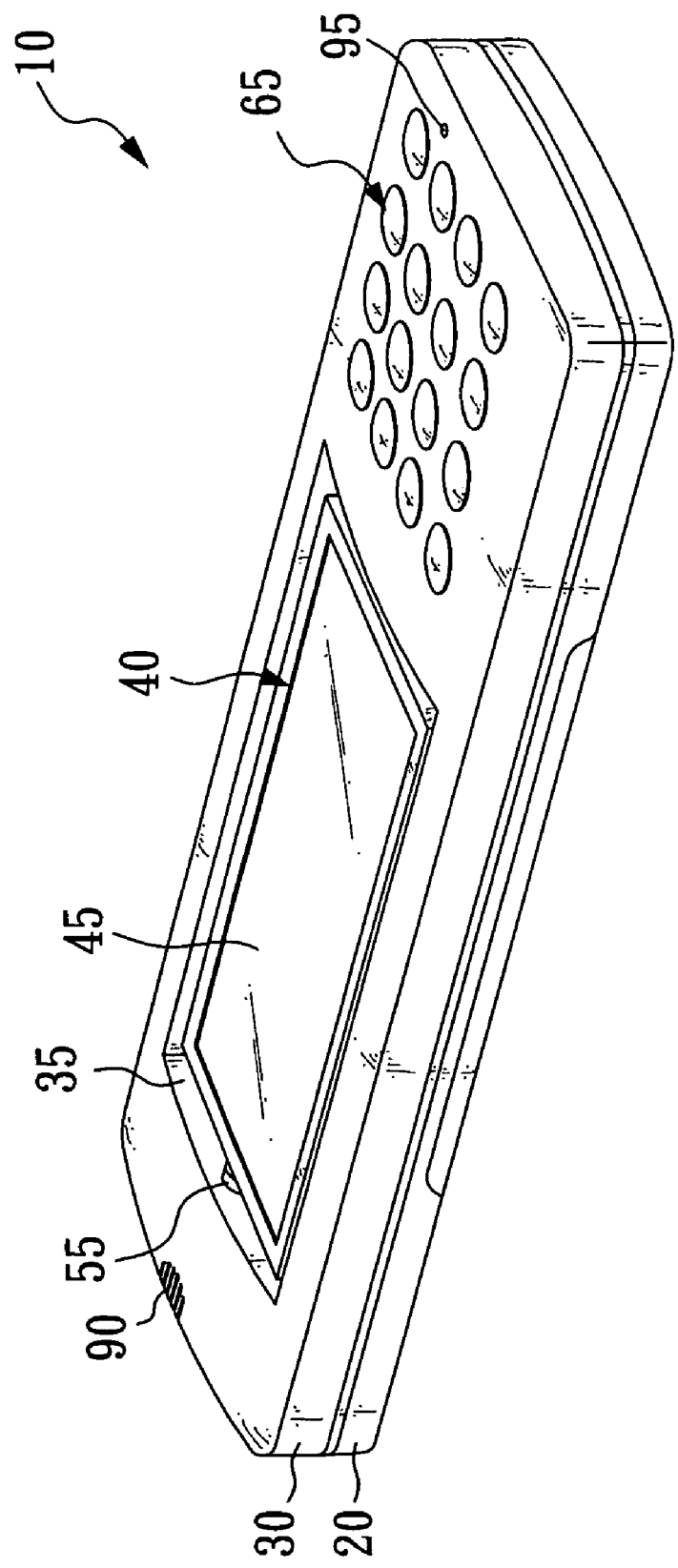
FIG. 3 is a perspective view of the communication device in its closed state.

Referring to FIGS. 1, 2, and 3, in a first preferred embodiment of the invention the cover 30 has a predetermined thickness, the display 40 has a predetermined thickness, the opening 35 has a predetermined vertical depth larger than the thickness of the display 40, the second pivotal elements 55 are provided on a horizontal line extended from one side of the opening 35 to the other opposite side thereof, and a distance from either second pivotal element 55 to one end of the opening 35 proximate the phone body 20 is larger than half width of the display 40 (i.e., a distance from either first pivotal element 50 to either end of the display 40). Thus, a user may turn over the display 40 in the opening 35 to dispose the screen 45 in a direction opposing the phone body 20 prior to closing the cover 30 onto the phone body 20.

Referring to FIGS. 1 to 3 again, the phone body 20 further comprises a sound transmission unit 70 at one side and a sound receiving unit 75 at the other side. The sound transmission unit 70 is implemented as a speaker which is adapted to convert electrical current representing voice signals of user of another communication device (not shown) to sound waves and amplify this sound to a desired volume for user hearing. The sound receiving unit 75 is implemented as a microphone. The microphone is adapted to convert voice uttered by a user into an electric signal representing the voice which is then sent to another communication device by the communication device 10 such that a user of another communication device may hear the voice. Moreover, a second sound transmission unit 90 is provided at one side of the cover 30 opposing the phone body 20. The second sound transmission unit 90 is disposed corresponding to the sound transmission unit 70. Also, a second sound receiving unit 95 is provided at the other side of the cover 30 opposing the phone body 20. The second sound receiving unit 95 is disposed corresponding to the sound receiving unit 75. Both the second sound transmission unit 90 and the second sound receiving unit 95 are implemented by either technique as detailed below. One technique is that a plurality of parallel elongate openings in close proximity are formed on each of the second sound transmission unit 90 and the second sound receiving unit 95. Sound broadcasted by the sound transmission unit 70 on the phone body 20 may pass the second sound transmission unit 90 to broadcast toward the communication device for user hearing when the cover 30 is closed onto the phone body 20. Also, voice uttered by a user may pass the second sound receiving unit 95 to be received by the sound receiving unit 75 and converted into an electric signal representing the voice. The other technique is that the second sound transmission unit 90 is also a speaker for amplifying sound and the second sound receiving unit 95 is also a microphone for converting voice into an electric signal representing the voice. Thus, a user of the communication device may communicate with a user of another communication device through the second sound transmission unit 90 and the second sound receiving unit 95 when the cover 30 is closed onto the phone body 20.

Referring to FIGS. 1 and 2 again, on the other end of the top surface of the phone body 20 facing the display 40 (i.e., the end opposite one end of the phone body 20 hingedly connected to the cover 30), there is provided a first fastening member 80. Also, on the other end of a bottom surface of the cover 30 facing the phone body 20 (i.e., the end opposite one end of the cover 30 hingedly connected to the phone body 20), there is provided a mated second fastening member 85. In the embodiment, the first fastening member 80 is a slot and the second fastening member 85 is a tab. The tab is adapted to insert into the slot to secure the cover 30 to the phone body 20 when the cover 30 is closed onto the phone body 20. Alternatively, the first fastening member 80 is a magnetic member and the second fastening member 85 is also a magnetic member. Thus, one magnetic member may attract the other magnetic member to secure the cover 30 to the phone body 20 when the cover 30 is closed onto the phone body 20. In either case, a user may easily carry the secured communication device 10.

While the invention herein disclosed has been described by means of specific embodiments, numerous modifications and variations could be made thereto by those skilled in the art without departing from the scope and spirit of the invention set forth in the claims.

What is claimed is:

1. A portable communication device comprising:
   a phone body including a first sound transmission unit at one side and a first sound receiving unit at the other side;
   a display including a first pivotal element provided at its either side, and a screen;
   a cover having one end being hinged on one end of the phone body and including an opening for receiving the display, and a second pivotal element provided at either side of the opening, wherein the first pivotal element is connected to the second pivotal element at the same side and is adapted to turn relative thereto to form a pivot such that rotating the display in the opening on the opposite pivots will dispose either the screen of the display facing the phone body or in a direction opposing the phone body;

a first fastening member provided on the other end of a top surface of the phone body facing the display, and a mated second fastening member provided on the other end of a bottom surface of the cover facing the phone body, wherein the second fastening member is adapted to insert into the first fastening member to secure the cover to the phone body when the cover is closed onto the phone body; and a second sound transmission unit provided at one side of the cover opposing the phone body and corresponding to the first sound transmission unit, and a second sound receiving unit provided at the other side of the cover opposing the phone body and corresponding to the first sound receiving unit.

2. The portable communication device of claim 1, further comprising a plurality of parallel openings formed on proximity to each of the second sound transmission unit and the second sound receiving unit.

3. The portable communication device of claim 1, wherein the second sound transmission unit is a speaker and the second sound receiving unit is a microphone.

4. The portable communication device of claim 1, further comprising a first input section provided on the top surface of the phone body facing the cover.

5. The portable communication device of claim 4, wherein the first input section is a standard keyboard.

6. The portable communication device of claim 5, wherein the standard keyboard is a QWERTY keyboard.

7. The portable communication device of claim 4, further comprising a second input section provided on a top surface of the cover opposing the phone body.

8. The portable communication device of claim 7, wherein the second input section is a telephone keypad.

9. The portable communication device of claim 1, wherein the display has a predetermined thickness and the opening has a predetermined depth larger than the thickness of the display such that the display is adapted to turn over in the opening prior to closing the cover onto the phone body.

* * * * *